J. F. M. FARQUHAR.
GREENHOUSE CONSTRUCTION.
APPLICATION FILED SEPT. 15, 1906.
927,958.
Patented July 13, 1909.
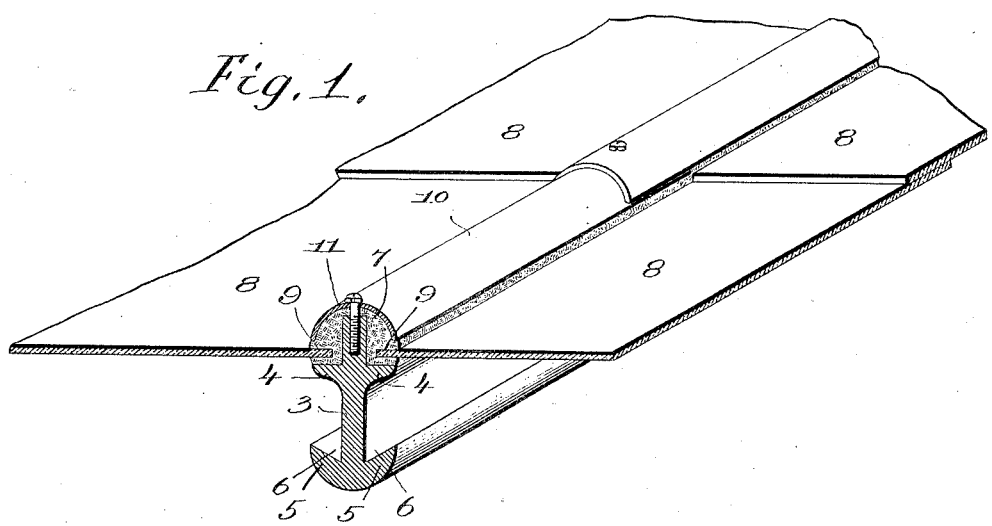
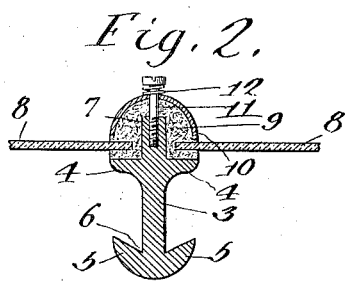
Witnesses:
Fred S. Greenleaf
William L. Friary
Inventor.
James F. M. Farquhar.
by Crosby & Gregory
Attys.

UNITED STATES PATENT OFFICE.

JAMES F. M. FARQUHAR, OF BOSTON, MASSACHUSETTS.

GREENHOUSE CONSTRUCTION.

No. 927,958.  Specification of Letters Patent.  Patented July 13, 1909.

Application filed September 15, 1906. Serial No. 334,772.

*To all whom it may concern:*

Be it known that I, JAMES F. M. FARQUHAR, a citizen of the United States, and resident of Boston, county of Suffolk, and State of Massachusetts, have invented an Improvement in Greenhouse Construction, of which the following description, in connection with the accompanying drawing, is a specification, like letters on the drawing representing like parts.

This invention relates to sash bars for skylights, green houses and glass roofs generally, and the manner of securing the glass thereto.

One embodiment of the invention will be described and then the novel features thereof will be pointed out in the appended claim.

In the drawings Figure 1 shows, in perspective, a portion of a glass roof or skylight embodying my invention. Fig. 2 shows a modification.

I propose to make my improved sash bar anchor shaped in cross section as shown in the drawings, that is, it has a central web 3, from which project the oppositely extending glass-receiving flanges 4 and the oppositely extending flanges 5 which form, with the rib 3, the gutters 6. The glass-receiving flanges 4 are situated between the edges of the web 3, so that a portion 7 of said web projects above the flanges, while the other flanges 5 are at the lower edge of the web.

The glass 8 of the roof or skylight is supported by the flanges 4, as shown in the drawing, and between the glass and the flanges 4 and also between said glass and the portion 7 of the web, I propose to use a suitable packing 9 which may be felt, asbestos, or any similar material which is yieldable and which will not become hard or inelastic. The glass is held in place by means of a cap 10 which is shown in the form of a semi-circular strip that overlies and embraces the portion 7 of the web, said cap 10 being held in place by suitable screws 11. In order to hold the glass firmly in position without incurring the danger of the glass breaking, owing to unequal expansion of material, or from any other cause, I propose to interpose some of the packing 9 between the cap 10 and the glass and also between said cap and the portion 7 of the rib.

As shown in the drawings, the packing 9 fills the space beneath the cap, forms a cushion between the cap and the glass and also a cushion between the glass and the sash bar. The packing serves two purposes, first, it fills and seals the joint between the glass and the sash bar, and thus prevents leakage, and second, it acts as a cushion for the glass. It also makes a cushion between the glass and the cap and between the cap and the sash bar. This cushioning effect is important because it prevents the glass from being cracked by unequal expansion of the glass and metal sash-bar. One of the principal reasons why the glass of skylights and greenhouse roofs become cracked or broken is because the glass is unyieldingly held in place and becomes broken by the expansion and contraction of the metal sash-bars. In my present invention I have aimed to prevent all this by using a cushioning material between the glass and both the sash-bar and retaining cap, and I not only use a material which remains elastic and does not become inelastic as putty does but I use sufficient material to afford the necessary elastic bed for the glass. If desired, suitable springs 12 may be employed between the head of the screws 11 and the cap, as shown in Fig. 2 these springs serving to still further cushion the cap.

The sash bar herein shown is of such a shape that it can be readily rolled and may thus be made of iron, although my invention contemplates the use of any suitable material in manufacturing it.

Having described my invention, what I claim as new and desire to secure by Letters Patent is:—

In a skylight, a sash-bar made as an integral structure and presenting a web, two oppositely-extending glass-receiving flanges and two oppositely-extending flanges 5 at the lower edge thereof, combined with glass sustained by the glass-receiving flanges, a cap covering the upper edge of the web and extending over the edge of the glass, yielding means to hold the cap to the web, and a felt cushion interposed between the glass and the glass-receiving flanges and filling the space between the glass and the sash bar and the cap.

In testimony whereof, I have signed my name to this specification, in the presence of two subscribing witnesses.

JAMES F. M. FARQUHAR.

Witnesses:
LOUIS C. SMITH,
MARGARET A. FEENEY.